United States Patent
Salcido et al.

(10) Patent No.: US 6,714,039 B2
(45) Date of Patent: Mar. 30, 2004

(54) INTERNAL BUS TERMINATION TECHNIQUE FOR INTEGRATED CIRCUITS WITH LOCAL PROCESS/VOLTAGE/TEMPERATURE COMPENSATION

(75) Inventors: Manuel Salcido, Fort Collins, CO (US); Gilbert Yoh, Fort Collins, CO (US); Salvador Salcido, Jr., Philonnath, OR (US); Scott T. Evans, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/144,112

(22) Filed: May 13, 2002

(65) Prior Publication Data

US 2003/0210070 A1 Nov. 13, 2003

(51) Int. Cl.$^7$ ................. H03K 19/003; H03K 19/0175; H03H 11/26
(52) U.S. Cl. ................. 326/30; 326/83; 327/262
(58) Field of Search ................. 326/30, 21, 31–33, 326/82–83; 327/276–278, 284, 262–263

(56) References Cited

U.S. PATENT DOCUMENTS

| | | | | |
|---|---|---|---|---|
| 4,980,580 A | * | 12/1990 | Ghoshal | 326/2 |
| 5,251,054 A | * | 10/1993 | Lynn | 398/202 |
| 6,204,710 B1 | * | 3/2001 | Goetting et al. | 327/276 |
| 6,351,171 B1 | * | 2/2002 | Balhiser | 327/318 |
| 6,400,176 B1 | * | 6/2002 | Griffin et al. | 326/30 |

FOREIGN PATENT DOCUMENTS

JP  59000958 A  *  1/1984 ........... H01L/27/10

* cited by examiner

Primary Examiner—James H Cho

(57) ABSTRACT

An active termination technique for reducing the propagation delay of a signal across a transmission line is presented. In accordance with a preferred embodiment of the invention, repeaters along a transmission line are paired with active termination circuits in very close proximity to the repeater in order to prevent signal reflections caused by the repeaters. The repeaters and associated active termination circuits are implemented with at least one PFET and at least one NFET, each having the same transistor gate lengths. The PFETs and the NFETs in the repeater and associated termination are ratioed to vary similarly over process/voltage/temperature variation.

7 Claims, 3 Drawing Sheets

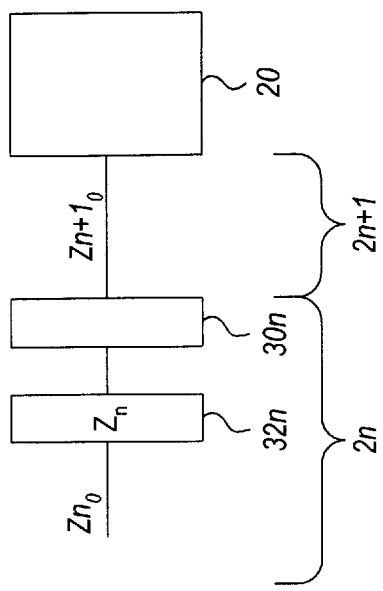
FIG. 4
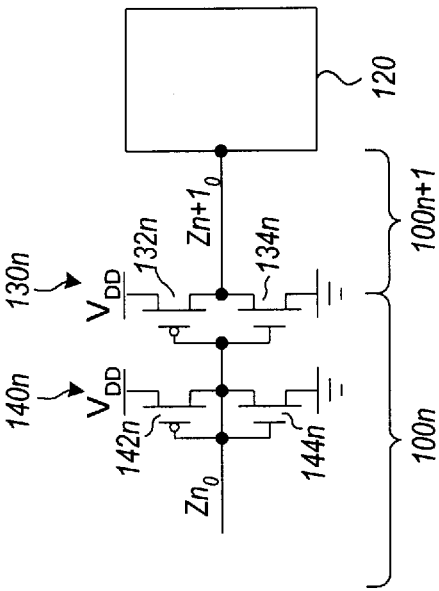
FIG. 5
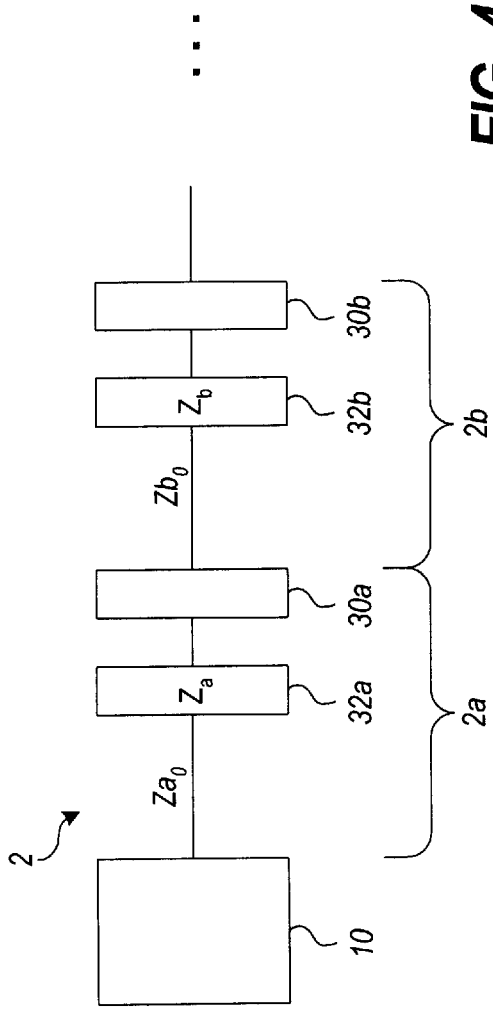
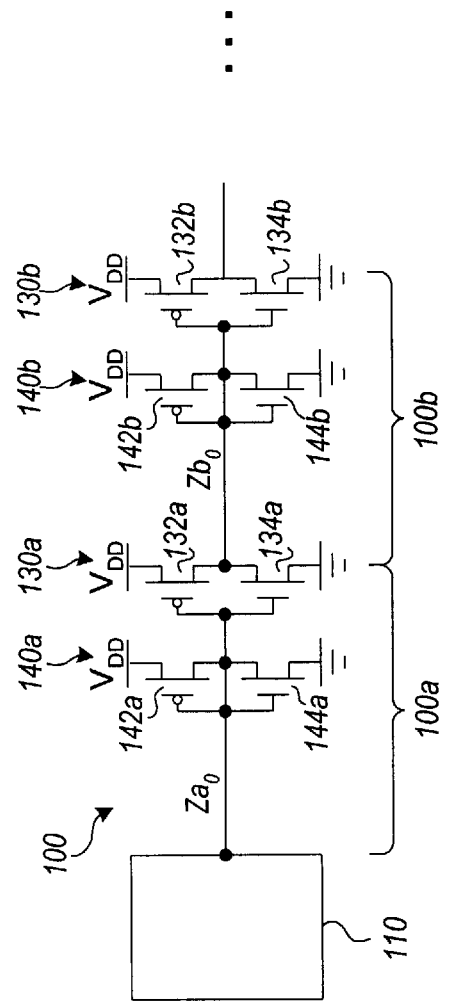

INTERNAL BUS TERMINATION TECHNIQUE FOR INTEGRATED CIRCUITS WITH LOCAL PROCESS/VOLTAGE/ TEMPERATURE COMPENSATION

FIELD OF THE INVENTION

The present invention pertains generally to integrated circuits, and more particularly to a termination technique for internal integrated circuit busses with local process/voltage/ temperature compensation.

BACKGROUND OF THE INVENTION

Integrated circuits communicate with one another using digital signals. In a binary system, the digital state of zero ("0", logic "low") is represented by the range of voltages between a minimum voltage $V_{MIN}$ (e.g., 0 volts) of the potential voltage range of the signal and a voltage $V_{LOW}$ that is low relative to the total range of voltage. The digital state of one ("1", logic "high") is represented by the range of voltages between a voltage $V_{HIGH}$ that is high relative to the total range of voltages and a maximum voltage $V_{MAX}$ (e.g., 1.5 volts) of the potential voltage range of the signal.

Because the signals are actually analog when transmitted over circuit transmission lines, the transition between digital states does not occur instantaneously, but instead occurs over a period of time that is dependent on physical conditions such as the parasitic resistance, inductance, and capacitance of the transmission line. The amount of time it takes to propagate a signal from one end of a transmission line to the other end of the transmission line is known as "propagation delay". Propagation delay is affected by the characteristic resistance, capacitance, and inductance of the metal used to construct the transmission line; accordingly, since the characteristic resistance, capacitance, and inductance of a line is dependent not only on the chemical and molecular properties of the metal used to form the transmission line, but also on the length, width, and thickness of the metal, propagation delay is therefore directly affected by the length and width of the line.

Functional circuit elements often operate on data that comprises multiple signals. For example, a circuit element may operate on a 16-bit data word. In order for the circuit element to complete the operation, all 16 bits must typically be available before the operation can be performed. Multiple-bit signals are typically transmitted in parallel over a multiple-transmission-line signal bus.

Variations in the lengths and widths of the individual transmission lines of a signal bus can result in non-synchronous arrival times of the individual bit signals at the receiving end of the bus. This phenomenon can result in undesirable signal jitter.

One method of improving signal integrity and arrival time skew of individual signal bits of a multiple-bit data bus is by equalizing the propagation delay between each of the transmission lines in the bus. Equalization may be achieved by inserting an appropriate number of repeaters along the various individual transmission lines such that each line is subject to approximately the same delay. Of course, the mere inclusion of a repeater along the transmission line results in some unavoidable minimum delay time. The minimum delay between the transmission of a signal and its receipt at the receiving end of the transmission line is often referred to as the insertion delay of the transmission line.

Insertion delay is an important property to consider in the design of transmission lines. Insertion delay is especially important when dealing with high frequency circuit operation because a long insertion delay can prevent the signal from being transmitted across a transmission line within a single (or other chosen integer number) clock cycle. If the insertion delay cannot be reduced enough to allow the signal to be transmitted over the line within a single clock cycle, then the signal takes twice (or even more times) as long to be transmitted over the bus, thereby effectively cutting the operating frequency of the bus in half (or less). Accordingly, minimizing the insertion delay is critical.

The insertion of repeaters along the transmission line can be problematic. First, the addition of repeaters along a transmission line essentially generates a subset of shorter transmission lines, each corresponding to a segment of the whole. Because each individual segment of the transmission line is itself merely a shorter transmission line, each segment will therefore exhibit transmission line properties such as propagation delay and signal reflections as well, albeit on a smaller scale.

Second, it is well-known that unless the impedance of a transmission line matches the impedance of the load it drives, a signal transmitted along the line will degrade due to signal reflections at the load. Accordingly, the repeater terminating each individual segment of the transmission line generates additional signal reflections.

Another difficulty in meeting satisfactory transmission line design requirements is that the operating characteristics of transistors such as CMOS transistors, from which integrated circuit signal drivers/receiver/repeaters are typically constructed, change under a variety of conditions, often referred to as process, voltage, temperature (PVT) variations. More specifically, the operating characteristics due to PVT variations may change with variations in manufacturing process (which can result in variations in the length L or width W dimensions of the transistors) as well as with variations in operating conditions such as junction temperature and supply voltage levels. The operating characteristics may also change with variations of voltage differences across the transistor terminals. If inadequate compensation is made for these variations, the output slew rate and output impedance of the driver/receiver/repeater may vary substantially along a particular transmission line as well as from transmission line to transmission line on a chip.

As is known in the art, complementary CMOS inverters are commonly used as repeaters along long transmission lines. FIG. 1 illustrates a complementary CMOS inverter 10. As illustrated, the complementary CMOS inverter 10 includes a p-channel field effect transistor (PFET) 12 with a source connected to a high power supply VDD, a gate connected to an inverter input node 16, and a drain connected to an inverter output node 18. The complementary CMOS inverter 10 also includes an n-channel field effect transistor (NFET) 14 with a source connected to a low voltage source (e.g., ground), a gate connected to the inverter input node 16, and a drain connected to the inverter output node 18.

The transfer characteristic of the CMOS inverter of FIG. 1 is shown in FIG. 2. The transfer characteristic plots $V_{OUT}$ over $V_{IN}$ for the range of values of $V_{IN}$. It is known in the art that if the threshold voltage $V_T$ for both the PFET and NFET is identical, $V_{OUT}$ may be defined as:

$$V_{OUT}=V_{IN}+V_T+[(V_{IN}+V_T)^2+VDD(VDD-2V_{IN}-2V_T)-(V_{IN}-V_T)^2]^{1/2},$$

where $V_{IN}$ is the input voltage, and VDD is the power supply voltage. As shown, in the ideal case, the inverter switches when $V_{IN}$=VDD/2.

As shown in FIG. 2, the transfer characteristic of the inverter is affected by the proportionality constants $\beta_p$ and $\beta_n$ of the respective PFET 12 and NFET 14. The proportionality constants $\beta_p$ and $\beta_n$ are dependent on the doping, construction, and dimensions (width W and length L) of the transistor. Accordingly, since the proportionality constants $\beta_p$ and $\beta_n$ may vary from one manufacturing process to another and even between localized areas of the chip within the same process, the transfer characteristic may be different across different chips manufactured in different groups and between localized areas of the same chip.

The transfer characteristic illustrates the effect of the proportionality constant ratio $\beta_p/\beta_n$ on the switching point (also called the "trigger point") of the inverter 10. As illustrated in FIG. 2, an inverter whose proportionality constant ratio $\beta_p/\beta_n$ is 10 switches at a much lower input voltage $V_{IN}$ than an inverter whose proportionality constant ratio $\beta_p/\beta_n$ is 0.1.

The transfer characteristic is also affected by the temperature of the inverter devices. As the temperature of the devices increases, the effective carrier mobility $\mu$ decreases, resulting in a decreased $\beta$ for the devices. Thus, the overall transfer characteristic of the inverter shifts to the left as temperature increases and shifts to the right as the temperature decreases.

PVT variations may be conceptualized as a box, shown in FIG. 3, across which the operating characteristics of the transistors move. One of ordinary skill in the art will appreciate that the three characteristics, process, voltage and temperature can be visualized as a three dimensional graph with a "slow corner" identifying a point when the three characteristics most fully affect operating conditions, and a "fast corner" identifying a point when the three characteristics do not greatly affect operating conditions. For example, the operating characteristics may move from a fastest corner of PVT variations to a slowest corner of PVT variations, and everywhere in between.

As described above, PVT variations affect the switching point of CMOS inverters used to implement repeaters along a transmission line. When a transmission line is optimized for operation at a nominal voltage, any change in PVT conditions will therefore affect the switching speed of the repeaters, which in turn affects the insertion delay of the transmission line. Accordingly, a need exists for a technique for ensuring consistent repeater switching speed despite variations in process, temperature and voltage.

A need also exists for maintaining high signal integrity when the transmission line is segmentized by repeaters.

SUMMARY OF THE INVENTION

The present invention is a technique for ensuring consistent repeater switching speed along a transmission line despite variations in process, temperature and voltage. Terminating repeaters are inserted along the transmission line to reduce the delay of the transmitted signal. Each terminating repeater includes a repeater and an associated termination circuit. Preferably each repeater is formed using at least one PFET and one NFET and has a metastability point centered around VDD/2 in the nominal case. An active termination circuit is positioned in close proximity to each repeater in order to prevent additional signal reflections generated by the repeater. The termination circuit is implemented with at least one PFET and one NFET, having identical transistor gate lengths as the PFET(s) and NFET(s) of the repeater. The termination circuit PFET and NFET are each ratioed to vary similarly to variations in the PFET and NFET of the repeater due to PVT variations. PVT variations shift the repeater's metastability point. The active termination scheme shifts with PVT conditions such that the DC voltage at the repeater node positively tracks the metastability point of the repeater, thereby allowing for more consistent switching speeds despite PVT variation.

BRIEF DESCRIPTION OF THE DRAWING

The invention will be better understood from a reading of the following detailed description taken in conjunction with the drawing in which like reference designators are used to designate like elements, and in which:

FIG. 4 is a block diagram of a transmission line of an integrated circuit implemented in accordance with the principles of the invention;

FIG. 5 is a schematic diagram of a preferred embodiment of the transmission line of FIG. 4;

DETAILED DESCRIPTION

Figure 1:
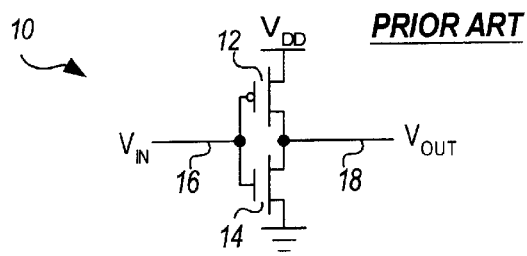
FIG. 1 is a schematic diagram of a conventional complementary CMOS inverter.
Figure 2:
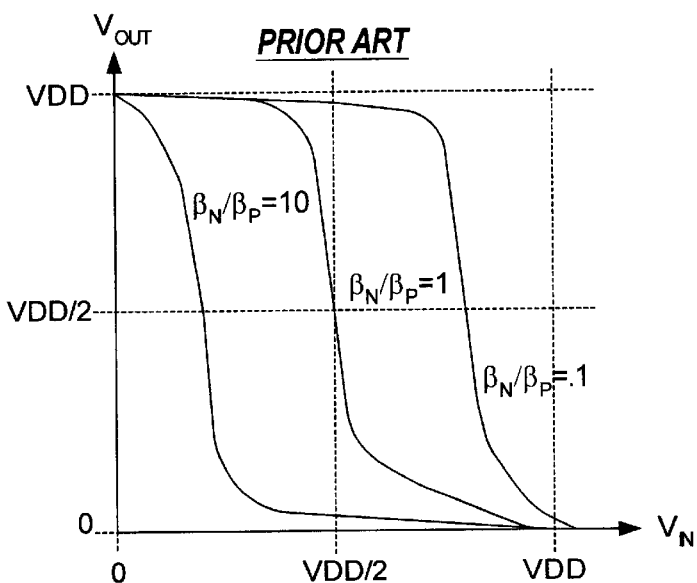
FIG. 2 illustrates the transfer characteristic of the CMOS inverter of FIG. 1.
Figure 3:
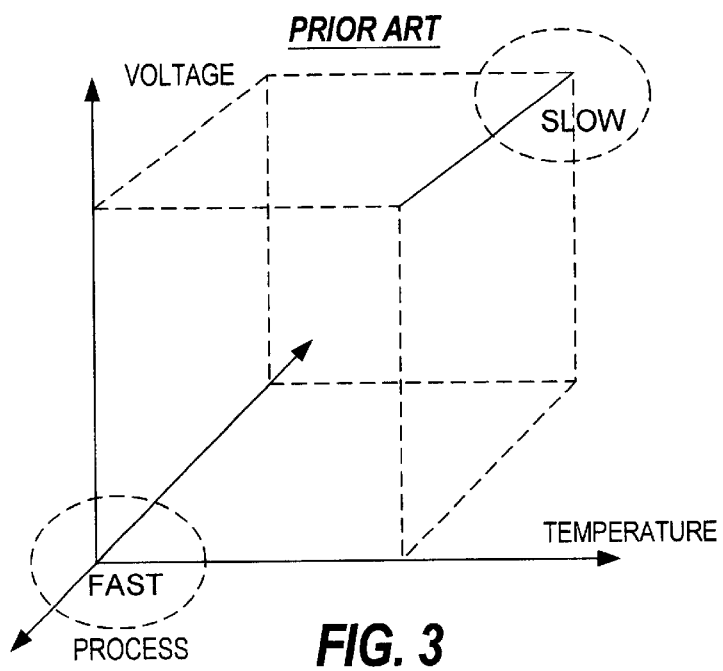
FIG. 3 is a three-dimensional graph illustrating the effects of PVT variation on transistor devices.

A novel method and circuit for ensuring consistent switching speed on a transmission line of an integrated circuit despite variations in process, temperature and voltage is described in detail hereinafter. Although the invention is described in terms of specific illustrative embodiments, it is to be understood that the embodiments described herein are by way of example only and that the scope of the invention is not intended to be limited thereby.

Turning now to the invention, FIG. 4 is a schematic block diagram of an integrated circuit transmission line 2 implemented in accordance with the principles of the invention. As illustrated, the transmission line 2 is connected between a driver circuit 10 and a terminating receiver circuit 20. In this configuration, terminating receiver circuit 20 is the load and includes termination circuitry to match the impedance of the transmission line segment 2n+1. In accordance with the invention, transmission line 2 also includes a plurality of repeater circuits 30a–30n along the line 2, which divides the transmission line 2 into a plurality of transmission line segments 2a through 2n+1. Importantly, each repeater circuit 30a–30n is terminated by a matching repeater termination circuit 32a–32n. Each respective matching repeater termination circuit 32a–32n is connected at the input of (or in very close proximity to) its respective repeater circuit 30a–30n.

Each repeater termination circuit 32a–32n provides a matching termination impedance $Z_a$–$Z_n$ that matches the characteristic impedance $Z_{ao}$–$Z_{no}$ of the transmission line segment 2a–2n that it terminates. By locating the matching termination impedance $Z_a$–$Z_n$ in parallel with the termination line segment 2a–2n in very close proximity to the repeater circuit 30a–30n, signal reflections generated by the repeater circuit 30a–30n can be eliminated or significantly reduced.

FIG. 5 illustrates a preferred embodiment of a transmission line 100 constructed in accordance with the principles of the invention. As illustrated in FIG. 5, in the preferred embodiment of the invention each repeater circuit 130a–130n comprises a complementary CMOS inverter, each comprising a PFET 132a–132n and an NFET 134a–134n; accordingly, the performance of the repeaters 130a–130n, and therefore the performance of the transmission line 100 as a whole, is affected by variations in process, voltage, and/or temperature.

Also in the preferred embodiment, each repeater termination circuit 140a–140n comprises a pair of complementary CMOS devices, including a PFET 142a–142n connected in parallel with the PFET 132a–132n of its corresponding repeater circuit 130a–130n and an NFET 144a–144n connected in parallel with the NFET 134a–134n of its corresponding repeater circuit 130a–130n.

Each termination circuit 140a–140n implements a Thevenin termination circuit with a PFET 142a–142n and an NFET 144a–144n characterized by respective resistance values $R_1$ and $R_2$ and capacitance values $C_1$ and $C_2$ whose parallel combination matches the characteristic impedance $Z_{ao}$–$Z_{no}$ of its respective transmission line segment 100a–100n. Importantly, the PFETs and NFETs of each of the repeaters 130a–130n and matching termination circuits 140a, 140n are implemented with identical gate lengths to ensure similar operation under PVT variations.

In the preferred illustrative embodiment, termination circuits 140a–140n implement an active termination scheme with field effect transistors PFETs 142a–142n and NFETs 144a–144n. Importantly, the FETs 142a–142n and 144a–144n are sized to charge the transmission line segments 100a–100n to a nominal input voltage of VDD/2 when the transmission line segments 100a–100n are not actively driven (i.e., are "floating"). Each repeater 130a–130n is tuned such that its optimal metastability point in the nominal case has a crossing point at VDD/2.

For illustration, assuming a transmission line characteristic impedance $Z_O$ of 50 Ohms for each transmission line segment 100a–100n, the Thevenin input resistance $R_{TH}$ of the respective terminating circuit 140a–140n looking in must also be 50 Ohms. Because the FET devices are non-linear, in order to supply the current required to charge the inputs to VDD/2 in the nominal case when the line is not driven, the PFETs and NFETs must be sized accordingly. In the preferred embodiment, FETs 126 and 127, and 126' and 127' are sized such that the characteristic resistances $R_1$ and $R_2$ of each FET are each matched to approximately 50 ohms at VDD/2. Preferably, all PFETs and NFETs in both the repeaters 130a–130n and their respective termination circuits 140a–140n are sized to have the same transistor gate lengths in order to result in similar PVT variation.

In contrast to prior art termination techniques, the invention uniquely employs transistors (FETs) in an active termination scheme for each repeater along the transmission line. FETs are not conventionally used to terminate transmission lines due to their susceptibility to PVT variations and resulting interference with ideal termination of the line. However, by employing the active termination in proximity to each repeater, and by using the same gate length for all PFETs and the same gate length for all NFETs in both the repeaters 130a–130n and their respective termination circuits 140a–140n, the termination circuit's optimal performance range will track its respective repeater's shift in optimal performance range due to PVT variations.

In this design, all PFETs 132a–132n and 142a–142n and all NFETs 134a–134n and 144a–144n have the same transistor gate lengths to allow similar variation with respect to PVT. In the termination circuits 140a–140n, the PFETs 142a–142n and NFETs 144a–144n are sized with equal drive strengths and are balanced to create a voltage divider at the terminator input equal to VDD/2 under nominal conditions. The repeater PFETs 132a–132n and NFETs 134a–134n are also preferably balanced to work optimally under nominal conditions. Accordingly, the repeater FETs are sized to have the same ratios of the termination circuit FETs.

Figure 6:
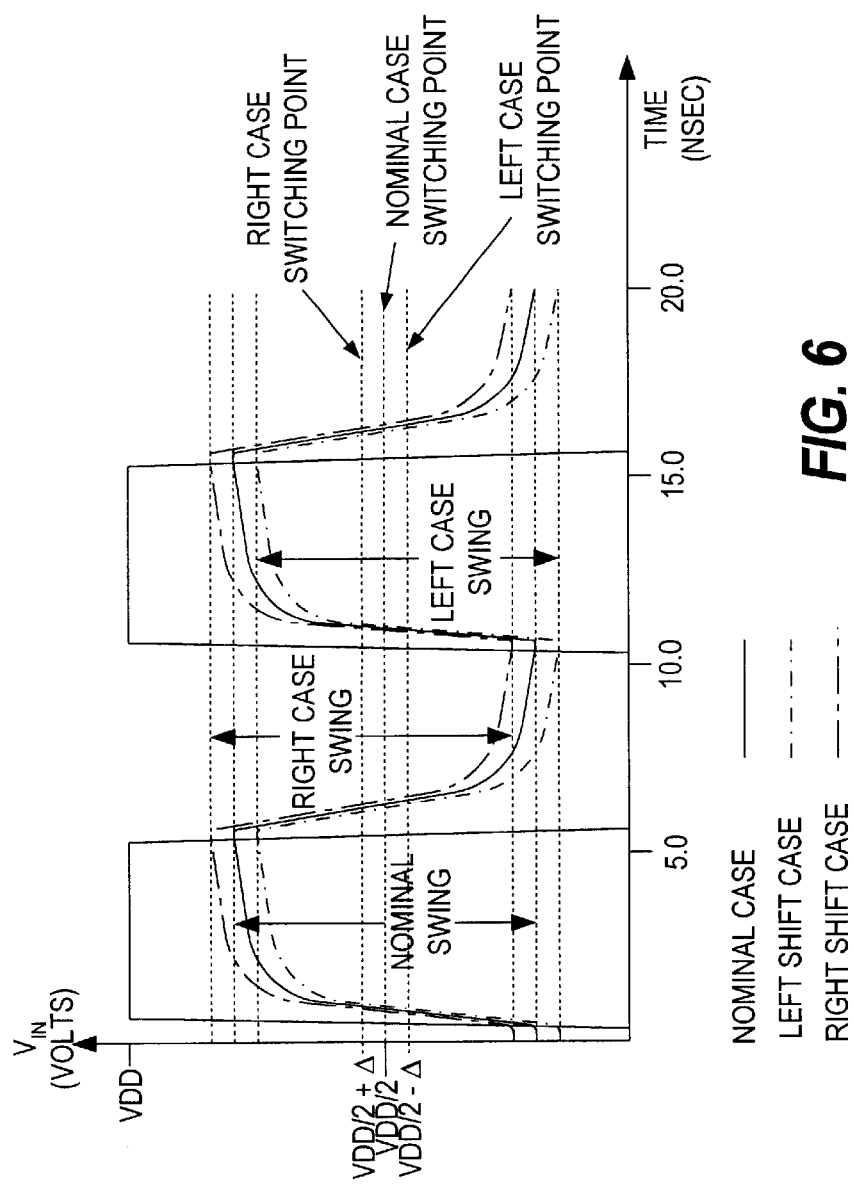
FIG. 6 is a timing diagram illustrating the operation of a repeater implemented in accordance with the invention during fast, nominal, and slow PVT conditions.

It will be appreciated by those skilled in the art that PVT variations in the repeater termination circuits 140a–140n track the PVT variations in their respective repeaters 130a–130n. In particular, in the nominal case, the termination/repeater circuit pair 130/140 performs optimally as long as the circuit is designed such that it is optimized to operate at VDD/2. FIG. 6 illustrates the operation of a locally terminated repeater implemented in accordance with the invention for the nominal, fast, and slow PVT conditions.

Since the PVT variations of each pair of termination circuit and repeater track one another, the DC value of the transmission line segment shifts in the same direction as the shift in the metastability point of the repeater. For example, with reference to FIG. 6, in the case where PVT variation causes the PFETs 132a–132n and 142a–142n to have a higher drive strength than the NFETs 134a–134n and 144a–144n, the termination circuit 140a–140n of the repeater circuit 130a–130n will shift the input signal seen at the input of the repeater circuit 130a–130n from VDD/2 to a lower voltage VDD/2 −ΔV. The metastability point of the repeater 130a–130n will also shift (to the left on the transfer characteristic) to a lower voltage for the same reason, allowing the repeater 130a–130n to remain in its optimal operating range.

In the case where PVT variation causes the NFETs 134a–134n and 144a–144n to have a higher drive strength than the PFETs 132a–132n and 142a–142n, the termination circuit 140a–140n of the repeater circuit 130a–130n will shift the input signal seen at the input of the repeater circuit 130a–130n from VDD/2 to a higher voltage VDD/2+ΔV. The metastability point of the repeater 130a–130n will shift to a higher voltage (to the right on the transfer characteristic) for the same reason, allowing the repeater 130a–130n to remain in its optimal operating range.

As shown in FIG. 6, since the DC value of the transmission line segment tracks the metastability point of the repeater, the propagated signal crosses the metastability point faster, thereby causing the repeater to switch faster and reducing the signal propagation time across the transmission line. Additionally, the signal swing at each bus transmission line is reduced, which reduces cross-talk effects from quickly switching adjacent lines.

Figure 7:
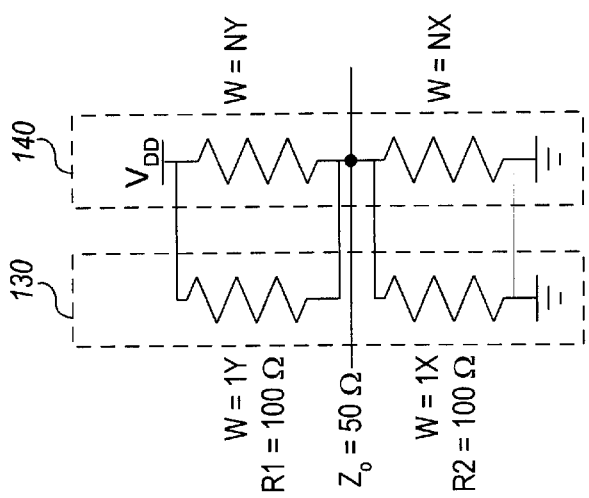
FIG. 7 is a circuit model diagram of a terminator and repeater circuit pair.

FIG. 7 illustrates a circuit model diagram of a repeater circuit 130 and its respective termination circuit 140, wherein all of the FETs are represented as resistors. As noted previously, the gate lengths of all PFETs in the repeater circuits 130a–130n and their associated termination circuits 140a–140n must be identical to one another, and the gate lengths of all NFETs in the repeater circuits 130a–130n and their associated termination circuits 140a–140n must also be identical to one another, in order to track PVT variations. Accordingly, ratio relationships between the transistors in the repeater circuits 130a–130n and their associated termination circuits 140a–140n are achieved by varying the gate width of the transistors.

For illustration, FIG. 7 shows that in the termination circuit 140, the width W of transistor gate of PFET 142 is sized as Y to achieve a resistance value $R_1$ of 100 Ohms when the input voltage on line 146 is VDD/2 and the width W of transistor gate of NFET 144 is sized as 1*X to achieve a resistance value $R_2$ of 100 Ohms when the input voltage on line 146 is VDD/2. FIG. 7 also shows that repeater circuit PFET 132 is sized to have gate width of N*Y and repeater circuit NFET 134 is sized to have gate width of N*X. Accordingly, the FET sizing ratio of the termination circuit is identical to the FET sizing ratio of the repeater circuit.

Accordingly, if the gate length ratios between the PFETs and NFETs of the circuit change due to process, voltage, or temperature variations, the repeater circuit PFET 132 will change in the same ratio as the termination circuit PFET 142; likewise, the repeater circuit NFET 134 will change in the same ratio as the termination circuit NFET 144. Accordingly, both circuits 130 and 140 will be affected in the same manner, and therefore the common-mode input voltage of the repeater circuit 130 moves up or down depending on how the PVT variation is skewed, while at the same time the metastability point of the repeater circuit 130 also moves up or down in the same direction and amplitude. For example, in the case that the PFETs are skewed with lower resistance $R_1$ than the resistance $R_2$ of the NFETs ("fast" PFETs and "slow" NFETs), the PVT variation results in more current flowing through the PFETs than through the NFETs. Accordingly, the common mode input voltage seen at the input of the repeater circuit 130a–130n will shift above the nominal input voltage VDD/2 to VDD/2+$\Delta$V. Since all PFETs and NFETs are sized to have identical transistor gate lengths, if the nominal input voltage VDD of the input signal at the repeater is skewed by an amount ±$\Delta$V, the metastability point of the repeater circuit 130a–130n is skewed by the same amount ±$\Delta$V in the same direction and therefore the repeater circuit 130a–130n detects the signal crossing point sooner. A similar result is obtained in the opposite direction if the NFETs are "slow" in comparison to the PFETs.

It will be appreciated by those skilled in the art that this methodology may be employed in various repeater and termination circuit designs so long as PFETs and NFETs are both used, and so long as the sizing ratios between the PFETs and NFETs in the repeater circuits are determined to vary similarly to the termination circuits with respect to PVT variations. This sizing ratio is achieved by using identical gate lengths and varying the widths of the FET devices to achieve the desired ratio.

The termination technique of the invention is advantageous over prior art techniques for several reasons. One advantage is that the termination circuitry tracks the local repeater's PVT variation, such that that PVT variation of the circuitry locally on that part of the integrated circuit and the termination circuitry will track each other in a positive manner, shifting the DC value of the signal line in the same direction as the metastability point of the repeater. This method causes the signal to cross the metastability point of the repeater faster, allowing the signal to propagate through long transmission lines more quickly.

The method also reduces cross-talk effects because it reduces the signal swing at each bus transmission line.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A transmission line of an integrated circuit, comprising:
    a driven end;
    a receiving end;
    one or more repeaters along said transmission line, at least one of said one or more repeaters comprising:
        a first PFET source coupled to a high voltage source, gate coupled to a repeater input, and drain coupled to a repeater output; and
        a first NFET source coupled to a low voltage source, gate coupled to said repeater input, and drain coupled to said repeater output; and
    one or more termination circuits corresponding to said one or more repeaters, each connected in close proximity to said repeater input of its respective corresponding repeater, at least one of said plurality of termination circuits comprising:
        a second PFET source coupled to a high voltage source, gate coupled to said repeater input, and drain coupled to said repeater input; and
        a second NFET source coupled to a low voltage source, gate coupled to said repeater input, and drain coupled to said repeater input;
    wherein first NFET and said second NFET are ratioed to vary similarly under process, voltage, and temperature (PVT) variation, and said first PFET and said second PFET are ratioed to vary similarly under process, voltage, and temperature (PVT) variation.

2. The transmission line in accordance with claim 1, wherein:
    each said one or more repeaters comprises at least one n-channel field effect transistor (NFET) and at least one p-channel field effect transistor (PFET); and
    each said one or more termination circuits comprises at least one NFET and at least one PFET;
    wherein said at least one NFET of each said one or more repeaters and said at least one NFET of its corresponding termination circuit are ratioed to vary similarly under process, voltage, and temperature (PVT) variation, and said at least one PFET of each said one or more repeaters and said at least one PFET of its corresponding termination circuit are ratioed to vary similarly under process, voltage, and temperature (PVT) variation.

3. The transmission line in accordance with claim 2, wherein each said at least one NFET, each said at least one PFET of repeater circuit, each said at least one NFET, and each said at least one PFET of said termination circuit have identical transistor gate lengths.

4. The transmission line in accordance with claim 1, wherein:
    said first PFET, said second PFET, said first NFET, and said second NFET each have identical gate lengths.

5. A method for reducing a propagation delay of a signal across a transmission line, comprising:
    inserting at least one repeater along said transmission line, said at least one repeater comprising a first PFET and a first NFET, said first PFET having a first PFET source, a first PFET gate, and a first PFET drain, and said first NFET having a first NFET source, a first NFET gate, and a first NFET drain, said inserting said at least one repeater comprising coupling said first PFET source to a high voltage source, coupling said first PFET gate to a repeater input, coupling said first PFET drain to a repeater output, coupling said first NFET source to a low voltage source, coupling said first NFET gate to said repeater input, and coupling said first NFET drain to said repeater output; and terminating said at least one repeater with at least one corresponding termination circuit in very close proximity to said repeater input of said at least one repeater, said at least one corresponding termination circuit comprising a second PFET and a second NFET, said second PFET having a second PFET source, a second PFET gate, and a second PFET drain, and said second NFET having a second NFET source, a second NFET gate, and a second NFET drain, said terminating said at least one repeater comprising coupling said second PFET source to a high voltage source, coupling said second PFET gate to a repeater input, coupling said second PFET drain to said repeater input, coupling said second NFET source to a low voltage source, coupling said second NFET gate to said repeater input, and coupling said second NFET drain to said repeater input; wherein first NFET and said second NFET are ratioed to vary similarly under process, voltage, and temperature (PVT) variation, and said first PFET and said second PFET are ratioed to vary similarly under process, voltage, and temperature (PVT) variation.

6. The method in accordance with claim 5, comprising:

implementing said first PFET and said second PFET with identical gate lengths; and implementing said first NFET and said second NFET with identical gate lengths.

7. The method in accordance with claim 5, comprising:

implementing each said first PFET, said second PFET, said first NFET, and said second NFET with identical gate lengths.

\* \* \* \* \*